United States Patent

[11] 3,584,663

| [72] | Inventor | Joseph R. Yacobucci |
| | | 65 Salisbury Ave., Blasdell, N.Y. 14219 |
| [21] | Appl. No. | 813,107 |
| [22] | Filed | Apr. 3, 1969 |
| [45] | Patented | June 15, 1971 |

[54] SUPPORT AND GUIDE MEANS FOR SAWS
10 Claims, 7 Drawing Figs.

[52] U.S. Cl.................................................. 143/6, 143/89
[51] Int. Cl................................................... B27b 27/06
[50] Field of Search......................................... 143/6—43, 86—89

[56] References Cited
UNITED STATES PATENTS

| 2,589,554 | 3/1952 | Killian............................ | 143/6 |
| 2,739,624 | 3/1956 | Haddock....................... | 143/6 |
| 2,804,104 | 8/1957 | Sasso............................. | 143/6 |
| 2,942,633 | 6/1960 | King.............................. | 143/6 |
| 3,028,888 | 4/1962 | Chapin et al.................. | 143/89 |

*Primary Examiner*—Donald R. Schran
*Attorney*—Christel & Bean

ABSTRACT: A power saw-supporting and guiding apparatus comprising a parallelogram linkage adapted to be pivotally mounted on a rigid upstanding wall of a miter box and having a plate for supporting a power saw. The support plate is provided with magnets for securing and retaining the power saw in properly oriented position. Vertically adjustable support legs are provided on opposite ends of the parallelogram linkage. A quadrant, having indicia imprinted thereon, is secured to the rigid upstanding wall and is provided with means for securing said parallelogram linkage to said quadrant at the desired angle.

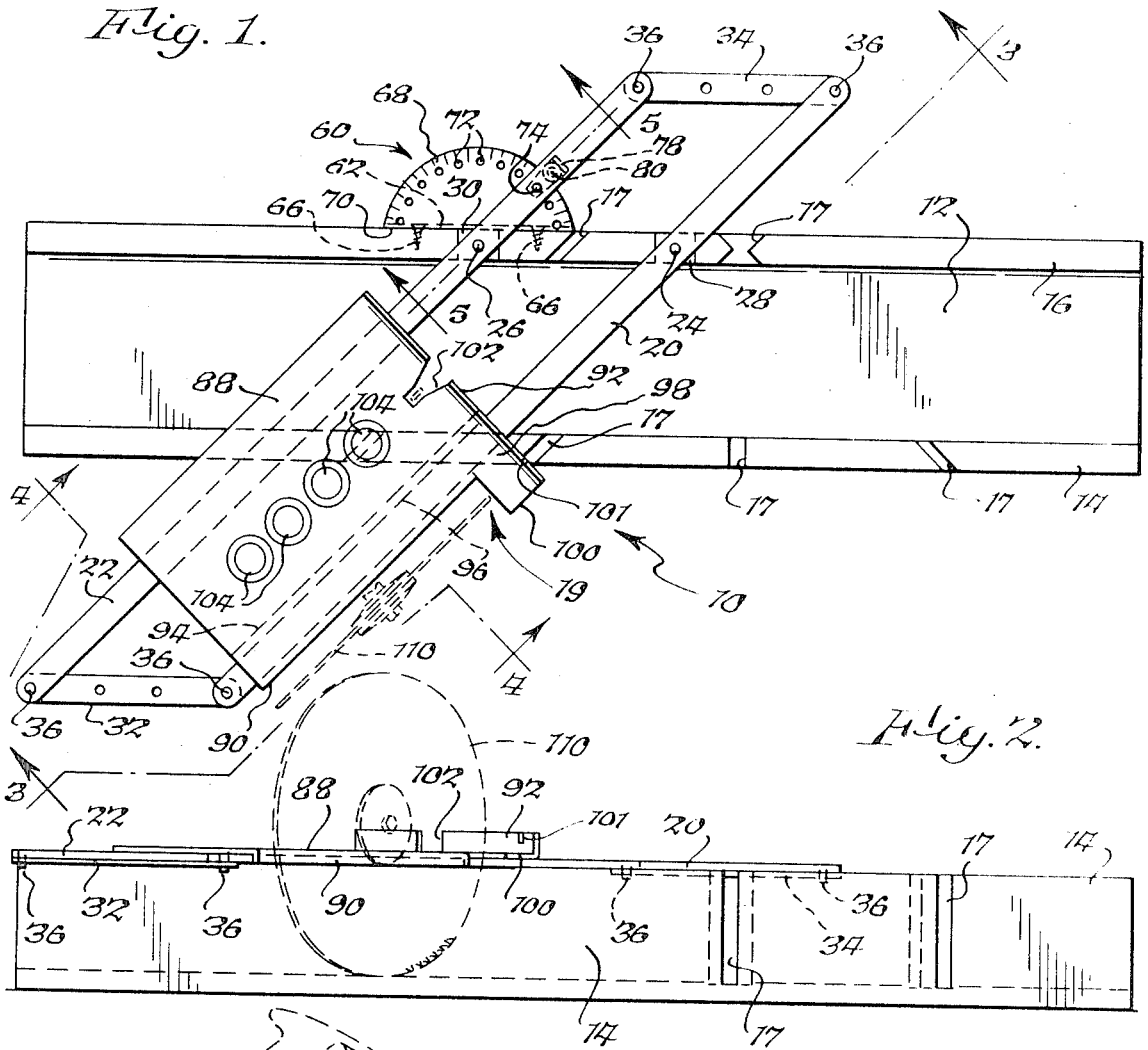
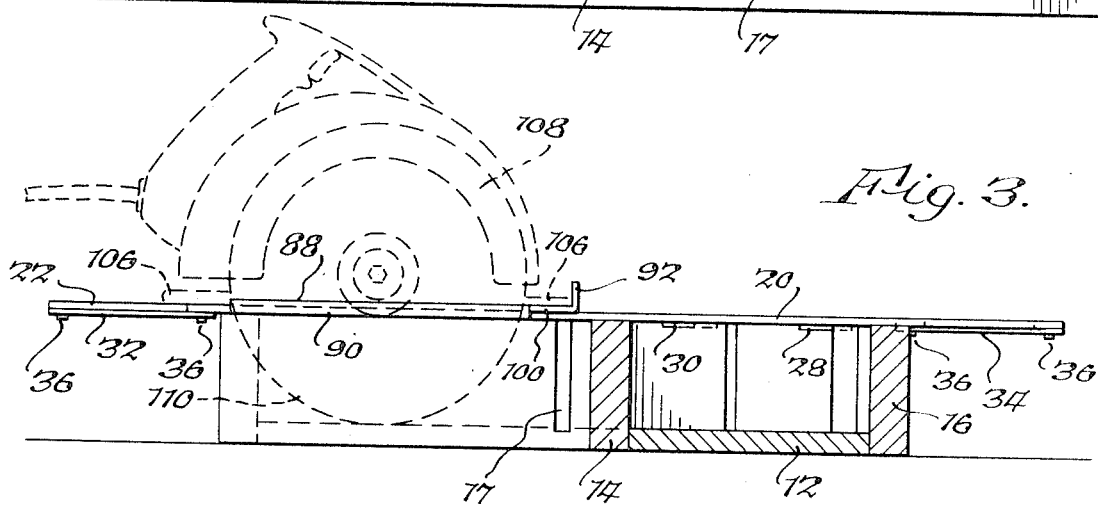

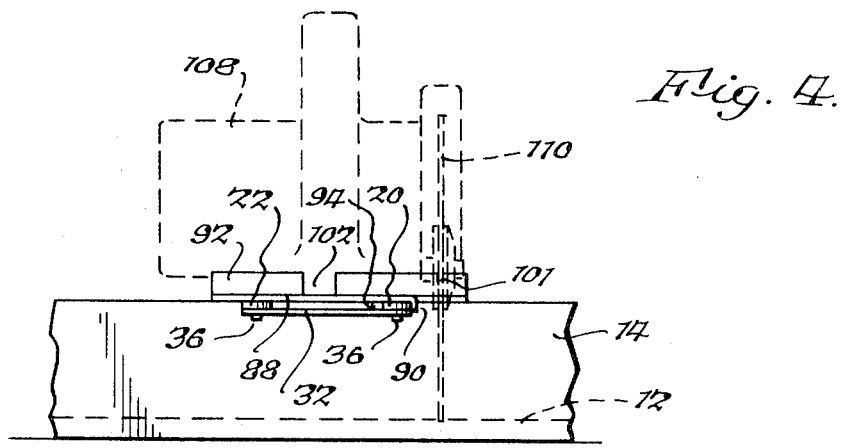
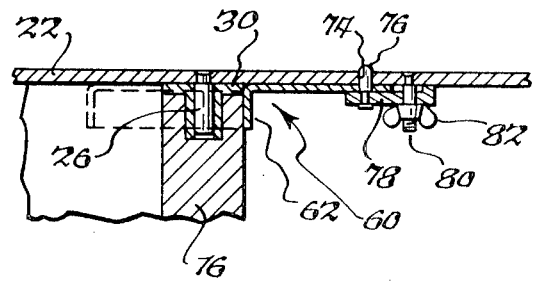
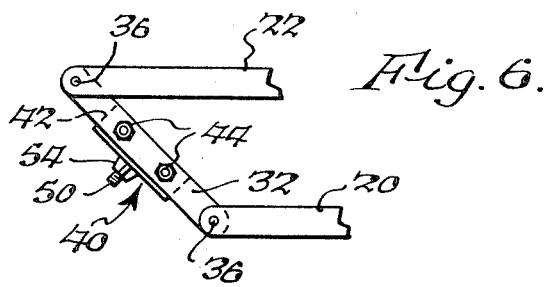
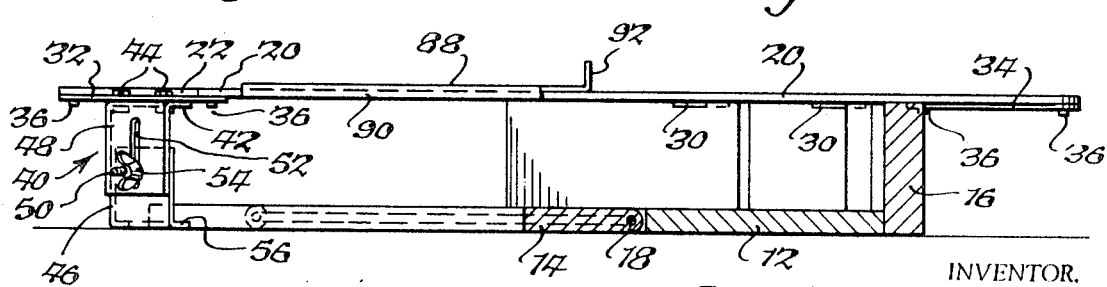

SUPPORT AND GUIDE MEANS FOR SAWS

BACKGROUND OF THE INVENTION

This invention relates to a support and guide apparatus for cutting devices and, more particularly, to a portable miter box for use with portable power-driven saws.

Portable power saws are used extensively on construction sites, in small shops, and in home workshops for cutting building materials, such as wood, plasterboard, flexible conduits, and the like. Generally, these saws consist of a housing in which an electric motor is mounted and which is operatively connected to a circular or a linear saw blade.

It is desirable to have some means for guiding these saws during the cutting operation as, for example, when it is desired to cut material square with the edge of the material, or to cut it at an angle, or compound angle. Many devices have been proposed for guiding power-driven saws but these devices are for the most part complex in construction, cumbersome and expensive to manufacture. Moreover, they are limited to a particular type of saw and are further restricted as to blade size, diameter, or length. Also, these saw-guiding devices limit the cuts that can be made to only a few common angles, such as 90°, 60°, 45° and 30°.

SUMMARY OF THE INVENTION

Accordingly, it is an object of the present invention to provide an improved saw supporting and guiding apparatus adapted for use with various types of power driven saws and which is simple and strong in construction, rugged and durable in use, and inexpensive to manufacture.

It is another object of this invention to provide the foregoing with guide means facilitating precision cuts through a wide range of angles.

It is further object of the present invention to provide an improved miter box having means for supporting a wide variety of power-driven saws.

The foregoing and other objects, advantages and characterizing features of the present invention will become clearly apparent from the ensuing detailed description of an illustrative embodiment thereof, taken together with the accompanying drawings wherein like reference numerals denote like parts throughout the various views.

BRIEF DESCRIPTION OF THE DRAWINGS

FIG. 1 is a top plan view of a saw support and guiding apparatus of the present invention;

FIG. 2 is a side elevational view of the saw support and guiding apparatus of FIG. 1;

FIG. 3 is a side elevational view, partially in section, taken about on line 3-3 of FIG. 1;

FIG. 4 is a fragmentary rear elevational view taken about on line 4-4 of FIG. 1;

FIG. 5 is a fragmentary section taken about on line 5-5 of FIG. 1;

FIG. 6 is a fragmentary top plan view illustrating an end connection of the parallelogram linkage of the apparatus of this invention; and FIG. 7 is a view similar to FIG. 3 showing a sidewall of the miter box in its lowered position and an adjustable leg support for the parallelogram linkage. D

DESCRIPTION OF THE ILLUSTRATED EMBODIMENT

Referring in detail to the drawings, there is shown in FIG. 1 a miter box, generally designated 10 with which the present invention is used, said miter box being formed of wood or metal for example, and comprising a base support member 12 having a pair of upright walls 14 and 16 extending upwardly from the sides of base member 12. Wall 14 can be suitably pivoted to base member 12 as shown at 18 (FIG. 7), if desired, to be moved downwardly out of the way during use of miter box 10, or can be completely omitted. Walls 14 and 16 are slotted as at 17 to permit passage of a saw blade through said walls. Numerous slots 17 can be provided in walls 15 and 16 and they can be cut at any angles desired within the purview of the present invention. Also slots can be cut into the upper surface of base member 12, if desired, to correspond to the angled slots 17 of walls 14 and 16.

A guide assembly, generally designated 19, comprises a pair of spaced, elongated, parallel guide bars 20 and 22, forming a parallelogram linkage. Bars 20 and 22 are mounted on wall 16 for pivotal movement relative thereto by means of pivot pins 24 and 26 (See FIG. 5) depending from the bottom of bars 20 and 22 and insertable in spaced bearings 28 and 30 provided in the upper edge of wall 16 (FIGS. 1 and 5). The opposite ends of bars 20 and 22 are provided with openings aligned with openings located adjacent each end of crossbars 32 and 34 for receiving pivot pins 36 thereby permitting guide bars 20 and 22 to pivot on pins 24 and 26 about any arcuate angle while maintaining said bars properly spaced.

A pair of adjustable support legs 40 (only one is shown in FIGS. 6 and 7) having inwardly directed flanges 42 are secured adjacent opposite ends of bars 20 and 22 to cross bars 32 and 34 by suitable fasteners, such as bolts 44. Although support legs 40 are provided at each opposite end of bars 20 and 22, only one such leg is shown in the drawings for clarity and convenience, and it should be understood that if desired, only one leg can be used, preferably at the rear or left end of bars 20 and 22 as shown in FIG. 7. Each leg 40 consists of two relatively movable brackets 46 and 48, bracket 46 being provided with a bolt 50 extending normal to the plane of bracket 46 and through elongated slot 52 in bracket 48. A wing nut 54 can be treaded onto bolt 50 to maintain brackets 46 and 48 in their vertically adjusted position. Brackets 46 have inwardly extending flanges 56 adapted to engage and bear against a support surface. It can be readily seen that legs 40 can be adjusted vertically to accommodate saw blades of various diameters or lengths, and to insure that guide bars 20 and 22 lie in a horizontal plane on miter box 10 when supporting the box on an uneven or irregular workbench or work table surface. Also, legs 40 can be pivotally mounted on crossbars 32 and 34, if desired, to enable them to be collapsed against the underside of the parallelogram linkage.

Secured to the outer side of wall 16 is a substantially semicircular quadrant, generally designated 60, having a depending flange 62 (FIG. 5) provided with laterally spaced openings for receiving a pair of screws 66 fastening flange 62 against wall 16. The upper surface of quadrant 60 is flush with the upper edge of wall 16 to provide a substantially continuous planar surface. Carried on the upper face of quadrant 60 adjacent the peripheral edge thereof is a curved row of indicia 68 indicating various angular degrees relative to the straight edge 70 of the quadrant 60, such indicia corresponding to a plurality of apertures 72, which are disposed about the marginal edge of quadrant 60 and are adapted to align with an opening 74 in guide bar 22 to receive a lockpin 76 of a clamping bracket 78. Bracket 78 engages the underside of slide bar 22 and is secured thereto by means of a bolt 80 depending from bar 22 which extends through bracket 78 and receives a wing nut 82 for releasably locking bar 22 in position at the desired angle. It should be appreciated that the principles of this invention contemplate the use of a spring-loaded device for removing and resetting lock pin 76 in apertures 72, if desired.

A substantially flat metal support plate 88 is provided for supporting a power-driven saw, said plate having a depending skirt 90 along a portion of one edge thereof and an upright rim 92 at the front edge thereof. An elongated bar 94 is secured to the underside of plate 88 and extends forwardly from the rear end thereof. Bar 94 is disposed parallel to skirt 90 for defining a guide recess 96 therebetween for receiving guide bar 20. Bar 94 has a close bearing fit with guide bar 20 to prevent any lateral play therebetween. Plate 88 is slidable on bars 20 and 22 and guided in a rectilinear path by means of recess 96 and bar 20. An ear 98 extends laterally outwardly from skirt 90 adjacent the forward end of plate 88 and is provided with a notch 101 in linear alignment with the plane of the teeth of a circular saw adapted to be supported by plate 88. Ear 98 can be made shorter so that the flat lateral edge 100 thereof can be the guide by which the saw teeth are aligned, if desired. A slot 102 is provided at the forward edge of plate 88 to accommodate a flat or saber blade in the event of mounting a jig saw on plate 88.

A plurality of magnets 104 are suitably secured to the upper surface of plate 88 for retaining the base 106 of a power saw 108, indicated in phantom in FIGS. 3 and 4. Although magnets 104 are preferable, it should be realized that the present invention envisages the use of other suitable securing means such as clamps, pins, bolts and screw fasteners for example. A power saw 108 having a circular blade 110 extending downwardly below skirt 90 can be utilized in the present invention, the forward edge of base 106 abutting rim 92 to accurately orient blade 110 normal to the forward edge of plate 88. Such power saws are adjustable vertically to vary the depth of cut. If desired, a power saw having a flat, elongated, saber blade can be mounted on support plate 88 with the saber blade, projecting downwardly into and below slot 102.

In use, a workpiece is placed in miter box 10 on base member 12 between walls 14 and 16. Guide assembly 19 is mounted on miter box 10 by inserting pins 24 and 26 in bearings 28 and 30. Guide assembly 19 is them pivoted about pins 24 and 26 until the desired angle is read along the inside edge of bar 22 on quadrant 60. If desired a slot can be cut into such edge providing a window for observing the indicia imprinted on quadrant 60. Lockpin 76 of clamp 78 is inserted in the proper aperture 72 to lock bar 22 in position against quadrant 60 by tightening wing nut 82. A power saw is positioned and properly oriented on support plate 88. Wall 14 can be pivoted downwardly to the position shown in FIG. 7 to permit passage of the saw blade thereby. Power is supplied to the saw by a suitable source (not shown) and the saw is advanced along with support plate 88 along guide bars 20 and 22 at the selected angle.

It should be appreciated that guide assembly 19 is not restricted in use to the particular portable miter box 10 shown and described, but has utility with other types of miter boxes and workpiece guide devices. For example, the support and guiding apparatus can be supplied in a compact kit form for use with any conventional miter box.

From the foregoing, it is apparent that the objects of the present invention have been fully accomplished. One form of the principles of this invention having been described and illustrated, it is to be understood that this has been done by way of illustration only.

I claim:
1. An apparatus for supporting and guiding a power tool comprising: guide means mounted on a supporting surface; said guide means comprising a parallelogram linkage having a pair of spaced, parallel guide bars and a pair of crossbars pivotally mounted adjacent their opposite ends to the opposite ends of said guide bars; each of said guide bars being pivotally mounted on said supporting surface; a support plate mounted for rectilinear sliding movement on said guide bars; means carried by said plate for releasably supporting a power tool; means adjacent said supporting surface for indicating various angular positions at which said guide bars can be selectively positioned in a spaced, parallel relation; and means for securing said guide bars in the selected position.

2. An apparatus according to claim 1, wherein the underside of said support plate is provided with a guide recess for receiving one of said guide bars.

3. An apparatus according to claim 1, together with means secured to said crossbars for supporting said guide means.

4. An apparatus according to claim 3, wherein said crossbar supporting means comprise at least one leg adjustable in a vertical direction and engageable with a support surface.

5. An apparatus according to claim 1 wherein said indicating means comprises a quadrant having a semicircular marginal edge with a plurality of openings arranged along said marginal edge and corresponding to indicia representing angles imprinted on the upper surface of said quadrant, and means interlocking with one of said openings for securing one of said guide bars to said quadrant.

6. An apparatus according to claim 1 wherein said supporting means includes at least one permanent magnet.

7. An apparatus according to claim 1 including a box support having a base and a sidewall extending upwardly from said base and having an upper edge whereby said guide bars are pivotally mounted on said upper edge of said box support.

8. An apparatus according to claim 7 wherein said indicating means comprises a quadrant having a portion secured to said sidewall and a portion extending horizontally in a plane including said upper edge of said box support.

9. An apparatus according to claim 8 wherein said horizontally extending portion has a curved edge and a plurality of openings arranged along said curved edge and corresponding to indicia representing angles imprinted on the upper surface of said horizontally extending portion.

10. An apparatus according to claim 9 including means interlocking with one of said openings for securing one of said guide bars to said quadrant.